April 28, 1964 M. DOLE ETAL 3,131,107
APPARATUS FOR FORMING A LAMINATED PAPER PRODUCT
Filed Dec. 22, 1958
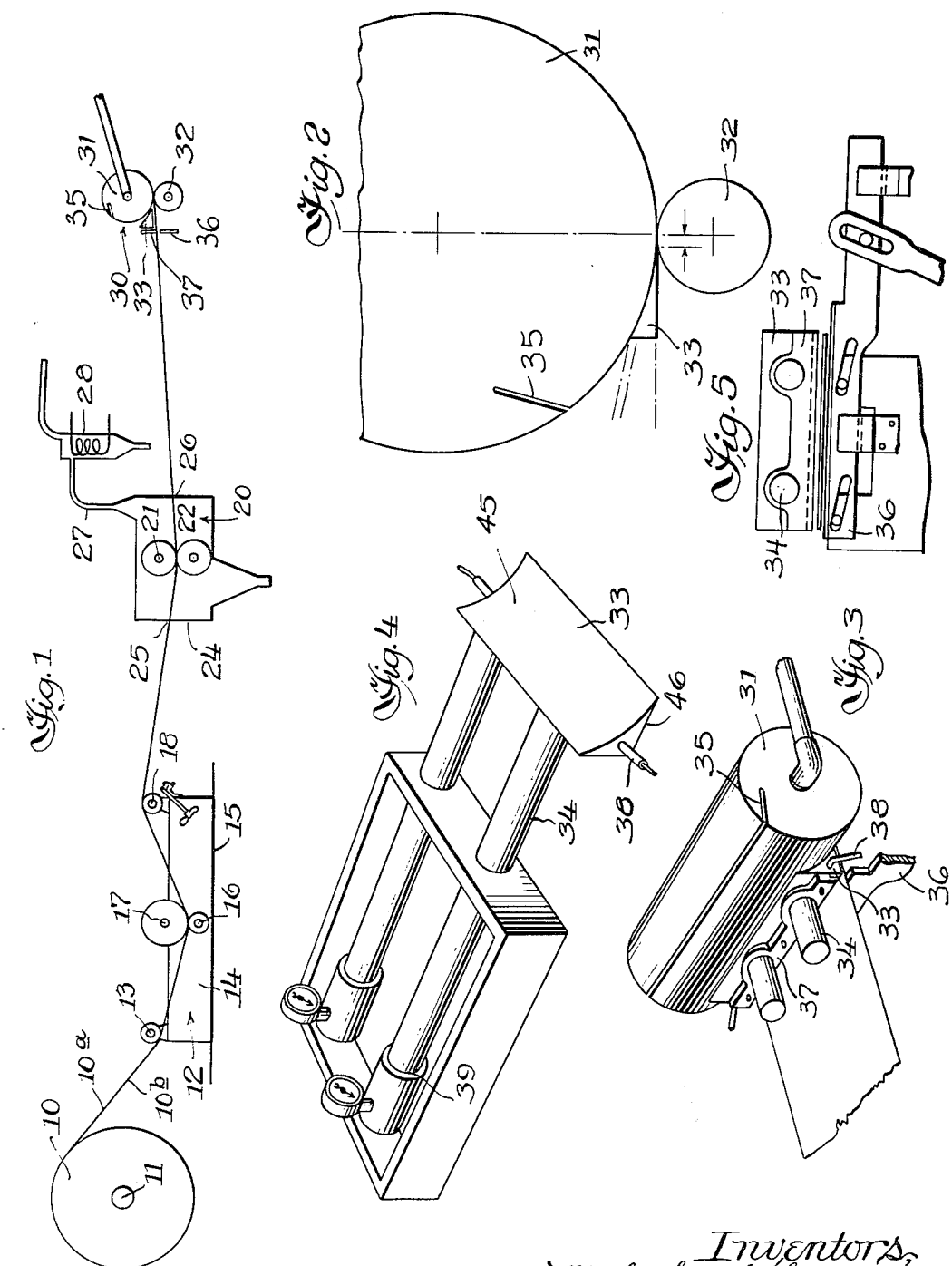
Inventors,
Malcolm Dole
and Henry B. Fischer,
By: Schneider, Dressler, Goldsmith & Clement,
Attys.

United States Patent Office 3,131,107
Patented Apr. 28, 1964

3,131,107
APPARATUS FOR FORMING A LAMINATED
PAPER PRODUCT
Malcolm Dole and Henry B. Fischer, Evanston, Ill.,
assignors to Bradley & Vrooman Company, a corporation of Illinois
Filed Dec. 22, 1958, Ser. No. 782,230
3 Claims. (Cl. 156—446)

This invention relates to laminated materials. More particularly, it relates to a method and apparatus for formation of laminate thermoplastic resin-impregnated paper and conversion thereof into tubular forms. Still more particularly, it relates to convolutely winding of paper impregnated with polyethylene to form the side walls for moisture proof paper drums.

Laminated paper products have been prepared through a variety of combinations of paper and resin and have presented many unusual bonding problems. Many types of adhesives have been utilized in preparing laminated papers having a wide variety of functions. Laminated paper board stocks for example, have been prepared having thickness governed by the number of plies of paper. Such laminated paper board stock are formed by winding paper stock helically into a tubular shape.

Tubular sections to be used in forming containers, drums and the like are prepared by winding paper stock on a forming drum. As the paper stock is fed toward the forming drum, sodium silicate binder is applied to one side of the paper. When the paper is drawn on the forming drum and high pressure is applied, one layer of paper is adhered to another until a sturdy shell of desired thickness is obtained. Tubular sections upon completion in the form of a drum are delivered to a drying oven to remove excess water which is present as a portion of the aqueous binder solution. Such drum shells are interiorly coated with a plastic film.

A primary purpose of interiorly coating the drum is to render the drum moisture and weather proof. With a single interior coating of polyethylene, any slight imperfection in the coating or crack due to rough handling may entirely destroy the impervious character of the interior drum lining.

In forming our new type of moisture and weather proof laminated paper product, a thermoplastic resin whose choice is dictated by the desired properties serves both to impart such properties as moisture proofing and to act as an adhesive binder. The forming steps comprise coating the paper stock on the opposite broad surfaces with a thermoplastic resin, drawing dry resin coated paper over a forming base or drum, heating a limited area of the two surfaces of resin coated paper which are brought into contact when the paper is overlapped to the softening point immediately before contact and applying pressure upon the overlapped paper when contacting the heat softened surfaces.

Production of laminated paper forms, particularly tubular forms, is described hereinafter with reference to the use of polyethylene as a representative thermoplastic resin.

In the preferred embodiment of the invention the processing steps comprise applying to the surface of paper stock a thin coating of a solvent solution of a thermoplastic resin, controlling the thickness of the coating on the paper, evaporating solvent from the coated paper stock, drawing the resin coated paper over a forming drum or rotatable mandrel member, heating to the softening point immediately before contact a limited area of the two surfaces of the resin coated paper which are brought into contact when the paper is overlapped and applying pressure upon the overlapped resin coated paper simultaneously with the contacting of the heat softened surfaces.

More in detail, polyethylene resin is dissolved in a suitable solvent such as toluene by heating the mixture to a temperature higher than 80° C., preferably to a temperature between 80° C. and 100° C. until a completely homogeneous solution is obtained. Solutions of polyethylene or other thermoplastic resins containing about 30% to about 60% by weight may be used. Solutions of 40% to 50% by weight of thermoplastic resin have the most desirable characteristics for penetration into paper, for ease of controlling the thickness of resin film deposited on the paper and the like.

Suitable weight paper such as kraft paper of 30–60 lbs. per thousand square feet and preferably so called liner board of 45–50 lbs. per thousand square feet is impregnated with polyethylene solution by any suitable means.

Paper at the time of formation into drums should have a coating of thermoplastic resin on both sides of the paper and preferably through the pores theerof. Deposit of the resin on the paper may be in a single operation or by a multiple stage operation whereby the paper is coated first on one side and then the other side. Preferably, the coating operation is carried out by immersing the paper in a polyethylene solution bath. Passage of the paper through the solution on a continuous basis may be at a rate timed for a controlled degree of penetration of the polyethylene solution into the paper. Impregnation by passage through solvent solutions of resin, has the advantage that pressure is not needed to accomplish penetration and the temperatures need only be high enough to maintain homogeneity of solution.

Upon removal of the impregnated paper stock from the immersion bath, excess polyethylene is removed therefrom and the resin film thickness controlled by a suitable squeegee apparatus arrangement, as by passage through a slit, etc. Removal of excess polyethylene, smoothing of the surface and evaporation of the solvent so as to obtain a dry surface free from tackiness may be accomplished in individual steps or may be accomplished simultaneously as by drawing the impregnated paper stock through a slit between heated rolls or pipes.

The temperature to which the rolls or pipes are heated varies with the solvent to be evaporated. The temperature may vary from temperature necessary to vaporize the particular solvent to a temperature having a slight softening effect upon the resin coating. When using a solvent such as toluene, drying of polyethylene films is carried out by temperatures between about 180° C. and about 200° C. Dowtherm heating units not only are capable of providing heat in the desired temperature range but also are well adapted to the desired close temperature control. If drying is carried out too rapidly, as by heating to too high a temperature or by bringing the impregnated paper up to temperature too quickly, or both, there is a deleterious effect upon the polyethylene surface evidenced by unevenness due to blistering.

When a solution of resin utilizes a solvent requiring temperatures above 150° C. for the vaporization of the solvent, it is usually preferable to perform the drying operation in two or more stages, for example, heating the impregnated paper to a temperature of about 150° C. until the major portion of the solvent has been driven off and then completing the drying at the same or a higher temperature.

Control of the polyethylene content of the impregnating solution assists materially in minimizing the problem or removal of excess polyethylene. In general, higher polyethylene concentrations give greater film thickness and low concentrations give more impregnation. Polyethylene film thickness, in order to form effective continuous moisture barriers, must be sucient to cover the nubs in the paper. If covering the nubs requires undesirably thick films, the raw paper may be given a sizing or primer coat prior to coating with polyethylene. For best priming results, paper is dip coated with primer and then given a drying treatment such as air drying for five minutes.

By depositing substantially the right amount of polyethylene on sized or unsized paper, the amount of excess polyethylene to be salvaged and to be reused is minimized. Avoidance of the reuse of large amounts of polyethylene is advantageous because polyethylene when repeatedly subjected to the action of solvents, becomes embrittled. Small quantities of reused polyethylene produce no apparent alteration in the tensile strength and flexibility of a polyethylene paper coating.

To produce a cylindrical shell for a fiber drum, the dry impregnated paper stock of a width equal to the height of the desired drum, is wound on a cylindrical forming member. This forming member may or may not be water cooled. Water cooled cylinders give better control over the winding operation. The first layer of paper stock is wound onto this forming cylinder in cold form so that it does not adhere to the cylinder. From the time that the paper stock starts to overlap and to form the second layer, the surfaces of the polyethylene coated paper stock which are about to come in contact are heated immediately before contact to a temperature between about 200° C. and about 350° C. and preferably between 200° C. and 250° C. by contacting heated surfaces.

As the heated polyethylene surfaces make contact, they are subjected to compressive pressure. This pressure may be exterted by a pressure roll which contacts the underside of the incoming impregnated paper stock and forces it against the previously wound layer of impregnated paper stock on the forming cylinder. By this method, a good bond is obtained between the two layers which are outermost at any stage of the winding operation inch by inch over the entire surface as the winding of the paper stock proceeds. Winding of paper stock continues until a cylinder of desired thickness is built up.

Details of the process are set forth more fully in connection with a description of a preferred illustrative embodiment of the apparatus for carrying out the sequence of steps necessary to the forming of the cylindrical position of a fiber drum.

FIGURE 1 is a schematic side elevational view of a drum forming line.

FIGURE 2 is a side elevation view of a drum forming unit and associated pressure element.

FIGURE 3 is a perspective view of the forming cylinder and a heating element.

FIGURE 4 is a perspective view of an actuating mechanism for positioning the heating element.

FIGURE 5 is a perspective view of a form of paper cutting apparatus suspendable from the apparatus for positioning the heating element.

As shown in the drawings, paper stock 10 of a weight of about 47 lbs. per 1,000 square feet is fed from a reel 11 to the impregnating station 12 at a rate of about 20 feet per minute.

At impregnating station 12, the paper passes under a guide 13 and is directed downwardly through a solution of polyethylene 14 maintained in a suitable tank 15. The paper is directed to pass between submerged guide roller 16 and the roller 17 and then passes upwardly out of the solution over a guide 18. Tank 15 is provided with suitable agitation and heating means to maintain the solution of polyethylene homogeneous.

Paper passes from impregnation station 12 to drying station 20 where excess polyethylene is removed from the paper and solvent for polyethylene is evaporated. Drying station 20 is illustrated as a single closed chamber but may consist of a series of similar units. The unit consists of two heated rolls 21 and 22 provided with means such as adjustment screws for tolerance regulation. Rolls 21 and 22 are adapted to be heated by suitable means such as Dowtherm medium, electricity, steam, etc. Excess polyethylene is removed as the impregnated paper passes between the rolls. This polyethylene has lost most of the solvent and is a solid which is collected in a hopper and is recovered for reuse.

Rolls 21 and 22 are enclosed in a housing 24 provided with aperture means 25 and 26 for ingress and egress of the paper stock. Housing 24 is provided with a vapor outlay conduit 27 leading to a condenser 28 of standard type for operation under a vacuum generally of 2–10 inches of mercury.

Dry impregnated paper leaving the housing 24 through slit 26 is delivered to winding station 30. Winding station 30 consists of a rotatable cylinder 31 which is the forming cylinder upon which the paper is wound. Cylinder 31 is adapted with a slit or other suitable means 35 for securing the lead edge of the paper during rotation of the cylinder. Paper stock feeds between cylinder 31 and a pressure roll 32. Pressure applied by roll 32 is of the order of 10–100 lbs. per square inch. Polyethylene coated surfaces 10a and 10b of the paper stock 10 are heated by a suitably shaped contact member 33 positioned to contact the surfaces 10a and 10b, respectively by suitable actuating arms 34. Windings on roll 31 are maintained cool by circulation of coolant through the roll by means of suitable inlet and outlet pipes.

When a sufficient number of layers of polyethylene impregnated paper have been wound to give a cylinder of desired wall thickness, the paper is cut off by suitable means, for example a knife 36 adapted to cooperate with shear plate 37 and the paper end is secured by a regular sealing operation.

The operation for forming a fiber drum is illustrated by the following example.

Polyethylene sold by E. I. du Pont under the trade name Alathon 16, is mixed with toluene and heated to 80° C. This solution, standardized to 40 lbs. of polyethylene per 100 lbs. of solution is introduced into the immersion tank 12 at a rate maintaining a constant level of solution. A continuous strip of kraft paper of 2 feet width and weighing 47 lbs. per 1,000 square feet was fed through the immersion tank at a rate of 20 linear feet per minute.

Upon emerging from the tank, the impregnated paper was heated by drawing through a 1/64 inch slit between two rotating rolls heated to 200° C. This drawing operation results in eliminating excess polyethylene and the solvent. There remains on the paper a coating of polyethylene averaging about 4 to 6 lbs. of polyethylene per 1,000 square feet of paper surface.

When operating continuously, this dry impregnated kraft paper at a temperature of about 200° C. passes directly to the winding cylinder. A pressure of 40 lbs. per square inch is exerted against the winding cylinder by the pressure cylinder. Immediately before the overlapping of the paper, the surfaces are softened by heating to 230° C. A ten ply winding of this impregnated kraft paper produces a cylinder of 1/8 inch wall thickness.

Such a 10 ply cylinder when formed into a drum exhibits excellent moisture impermeability when using 5 lbs. of polyethylene per 1,000 square feet of coated paper. This excellent moisture proofing is at least partially attributable to the better control of polyethylene distribution when utilizing solvent solutions as distinguished from the normal polyethylene coating operations. The excellent moisture proofing may also be partially attributable to the multiplicity of polyethylene films which eliminate the possibility of a single imperfection carrying through the moisture barrier and markedly reducing moisture resistance. Further, for identical 10 ply, 55 gallon drums, superior results are attained using 1.72 lbs. of polyethylene as adhesive as compared to 2.5 lbs. of sodium silicate binder.

The above description was based upon the use of polyethylene. Other thermoplastic resins may be used singly or in combination such as polyisobutylene, polyvinyl acetate, polyvinyl ethers, polymethacrylic and polyacrylic esters, maleic anhydride adducts-glycerol-fatty acid resins, polyhydric alcohol-polybasic acid resins, for example, glycerol-phthalic anhydride resin, pentaerythritol-adipic acid resin and the like, epoxy resins which may or may not be modified with one or more of the urea resins, phenolic resins, melamine resins, etc. said epoxy resins being condensation polymers of dihydroxy diphenyl methyl methane and epichlorhydrin, or glycerol and epichlorhydrin epoxidized by removing hydrochloric acid and the like, polymerized diallyl fumarate, mixed maleic modified copolymers of vinyl halides-vinyl esters of carboxylic acids and the like.

With regard to mixtures, polyethylene and epoxy resins exhibit ability to adhere to a wide variety of materials. When small amounts of an epoxy resin such as the resin sold under the trade name Epon 1007 by Shell Chemical Corporation are mixed with polyethylene, for example, one part epon resin by weight to four parts polyethylene by weight and the mixture dispersed in methyl ethyl ketone, an adhesive composition is obtained which adheres to steel and paper primers to which polyethylene alone has no adhesion. By blending polyethylene and various thermoplastic resins, or blending the various thermoplastic resins in various proportions, a wide range of physical properties is attainable often with a definite cost advantage to be realized.

In preparing adhesives from these thermoplastic resins, various solvents may be used such as the hydrocarbons benzene, toluene, xylene and naptha, halogen substituted compounds such as trichlormethane, dichlorethylene, carbon tetrachloride, ketones such as acetone diethyl ketone, methyl ethyl ketone, methyl isopropyl ketone, alcohols such as methyl, ethyl, propyl, isopropyl, n-butyl, sec. butyl alcohols and the like and mixtures thereof.

While reference has been made to coating the paper with thermoplastic resin by immersion in a solution, coatings may also be applied by spraying the paper with solutions or dispersions of the resins. Solution and dispersions of resins may also contain pigments, fillers, plasticizers, etc., compatible with the resins for the formation of adhesives.

By the new method, one surface of the paper stock which has been impregnated with adhesive comprising predominantly thermoplastic resin, is activated by heating in a limited area adjacent the pressure zone and adhered by pressure to the back of the adjacent convolution of the impregnated paper wound on the forming cylinder. Heating to activate the thermoplastic coating on the paper requires control both as to temperature and as to area. If the impregnated sheet is heated to too high a temperature and over too large an area, the resin flows and migrates giving rise to "holidays" or dry spots. The presence of dry spots when winding cylinders results in poor adhesion and weak spots.

A preferred embodiment of the wedge shaped heating apparatus for the drum forming unit is illustrated in FIGURES 2, 3 and 4.

The heating element 33 must be movable so as to be actuated quickly into contact at the beginning of the drum forming operation as the first layer is overlapped and rapidly withdrawn from contact after a drum is completely wound. Heating element 33 is provided with two surfaces for contacting impregnated paper. The surface 45 of element 33 will be a concave surface preferably an arc of a circle whose radius of curvature will depend upon the size of the particular drum or cylinder whose surface is to be contacted. The surface 46 of element 33 may be a flat or convex surface. The angle of approach of the wedge-shaped heating element to the drum will usually be governed by and be a function of the drum radius.

This angle may be determined by striking a secant across the arc of the convex surface 45 and determining the angle between the secant and the straight paper flow axis. When the heating element 33 is in the contact position due to proper positioning, the tip of the wedge-shaped heating element should be offset from the center line of the forming cylinder by as short a distance as practical, generally about ½ inch to 1 inch.

Heating element 33 is provided with suitable electrical conduit 38 to connect the internal heaters to a suitable source of electric power. Heating element 33 is supported by cylindrical arms 34. Cylindrical arms 34 are reciprocable by hydraulic actuating means 39.

With the new method, the pressure normally required for adhering laminates is greatly reduced. Further, the limited area of softening or concentrated area of heating makes it possible to effect the softening of the resin eliminating the waste of heat because only one surface in a limited region adjacent the pressure zone is subject to the heating action at any one time.

Although the invention has been described in connection with specific embodiments thereof, it will be understood that these are not to be regarded as limitations upon the scope of the invention except insofar as included in the accompanying claims.

We claim:

1. Apparatus for forming a laminated paper product comprising a rotatable mandrel member, pressure exerting means adjacent the outer surface of said mandrel member, guide means for directing thermoplastic resin impregnated paper to the winding mandrel so as to pass initially between the mandrel and the pressure exerting means, means associated with said mandrel member to secure the lead edge of said paper during mandrel rotation, heating means positioned adjacent the point of overlapping of incoming paper and paper on said rotating mandrel, said heating means being adapted to soften the thermoplastic resin coating of paper on the forming member and on the mandrel side of the incoming paper and actuating means for withdrawing the heating means from contact position at start up of winding and at the time of removing the formed laminated structure.

2. Apparatus for forming a laminated paper product comprising a rotatable mandrel member, pressure exerting means adjacent the outer surface of said mandrel member, guide means for directing thermoplastic resin impregnated paper to the rotatable mandrel so as to pass initially between the mandrel and the pressure exerting means, means associated with said mandrel member to secure the lead edge of said paper during rotation of said mandrel, heating means positioned adjacent the point of overlapping of the incoming paper and paper on said mandrel during mandrel rotation, said heating means being adapted with two hot surfaces, one surface being a concave surface adapted to contact paper on the rotating mandrel and one surface to contact the inside surface of paper approaching the mandrel, and actuating means for withdrawing the heating means from contact position at start up of winding of paper and at the time of removing the formed laminated structure.

3. Apparatus for forming a laminated paper product comprising a rotatable mandrel member, inlet and outlet means for circulation of cooling medium through the rotatable mandrel member, pressure exerting means adjacent the outer surface of said mandrel member, guide means for directing thermoplastic resin impregnated paper to the winding mandrel so as to pass initially between the mandrel and the pressure exerting means, means associated with said mandrel member to secure the lead edge of said paper during mandrel rotation, heating means positioned adjacent the point of overlapping of incoming paper and paper on said rotating mandrel, said heating means being adapted to soften the thermoplastic resin coating of paper on the forming member and on the mandrel side of the incoming paper and actuating means for withdrawing the heating means from contact position at start up of winding and at the time of removing the formed laminated structure.

References Cited in the file of this patent

UNITED STATES PATENTS

| | | |
|---|---|---|
| 2,001,031 | Landt | May 14, 1935 |
| 2,066,991 | Lutz | Jan. 5, 1937 |
| 2,130,727 | Aument | Sept. 20, 1938 |
| 2,224,370 | Wescott | Dec. 10, 1940 |
| 2,355,673 | Person | Aug. 15, 1944 |
| 2,387,566 | Custers | Oct. 23, 1945 |
| 2,398,398 | Abbott | Apr. 16, 1946 |
| 2,570,921 | Collins | Oct. 9, 1951 |
| 2,711,982 | Straka | June 28, 1955 |
| 2,728,275 | Berg | Dec. 27, 1955 |
| 2,770,609 | Symonds | Nov. 13, 1956 |
| 2,791,570 | Backlund | May 7, 1957 |
| 2,854,031 | Donaldson | Sept. 30, 1958 |
| 2,914,091 | Barnes et al. | Nov. 24, 1959 |
| 2,934,130 | Lane et al. | Apr. 26, 1960 |
| 2,943,955 | Brill | July 5, 1960 |